United States Patent

Watanabe et al.

[11] 3,797,872
[45] Mar. 19, 1974

[54] BUMPER FOR VEHICLES

[75] Inventors: Tadakiyo Watanabe; Hiromu Konishi; Ken-ichi Chiku, all of Toyota, Japan

[73] Assignee: Toyota Jidosha Kogyo Kabushiki Kaisha, Aichi-ken, Japan

[22] Filed: Dec. 20, 1971

[21] Appl. No.: 209,699

[30] Foreign Application Priority Data
Mar. 8, 1971 Japan............................ 46-12345

[52] U.S. Cl. ........................... 293/30, 293/70
[51] Int. Cl. ................................ B60r 19/06
[58] Field of Search ............ 293/30, DIG. 2, 62, 73, 293/85, 86, 70; 114/219; 213/8

[56] References Cited
UNITED STATES PATENTS

| | | | |
|---|---|---|---|
| 3,226,146 | 12/1965 | Behr | 293/86 |
| 1,723,508 | 8/1929 | Hansen | 293/30 |
| 1,578,956 | 3/1926 | Clark | 293/86 |
| 1,530,017 | 3/1925 | Souliotis | 293/85 |
| 3,346,292 | 10/1967 | Lundman | 293/73 |
| 2,191,368 | 2/1940 | Cavanaugh | 293/30 |
| 3,596,962 | 8/1971 | Hertzell | 293/62 |

*Primary Examiner*—Gerald M. Forlenza
*Assistant Examiner*—Robert Saifer
*Attorney, Agent, or Firm*—Stevens, Davis, Miller & Mosher

[57] ABSTRACT

A bumper device for automobiles and other vehicles comprising at least one pair of bumper plates provided symmetrically on the front and rear sides or right and left sides of a vehicle body, and at least one pair of piston cylinder mechanisms mounted on front and rear sides or right and left sides of the vehicle body for supporting one pair of bumper plates. The device further comprises at least one pair of connection lines for inter-connecting the corresponding piston cylinder mechanisms and filled with fluid, and at least one pair of pressure reducing valves each mounted between one of the pair of piston cylinder mechanisms and one of the pair of connection lines.

5 Claims, 2 Drawing Figures

PATENTED MAR 19 1974 3,797,872
FIG. I
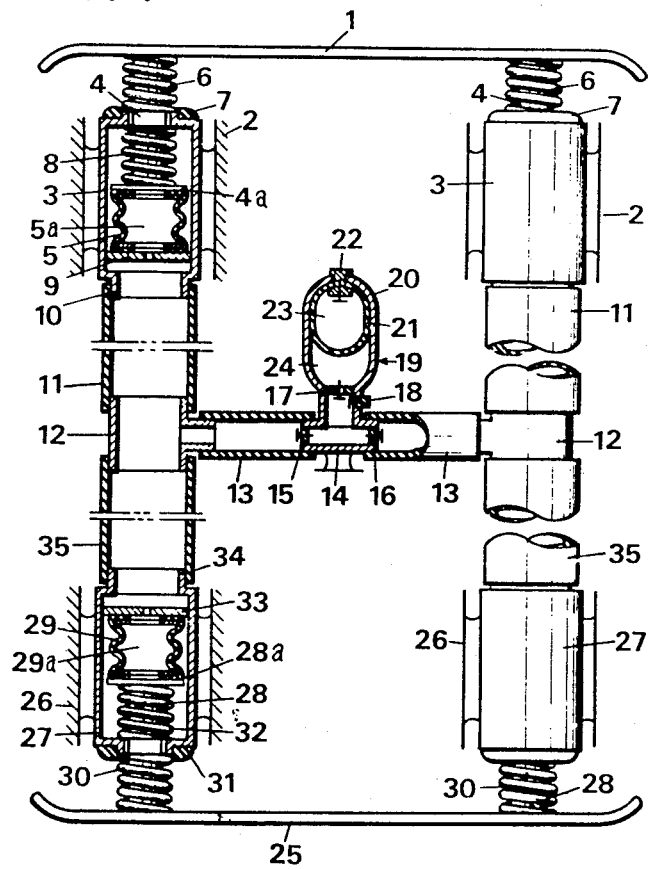
FIG. 2
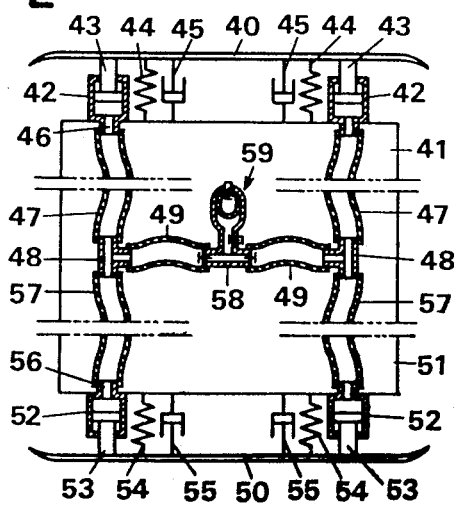

BUMPER FOR VEHICLES

This invention relates to a bumper for automobiles and other vehicles.

The practice of mounting bumpers on the front and rear sides of automobiles and other vehicles has been popularized. Bumper devices of the prior art have been such that the bumper plates are merely mounted on car bodies through support means. In devices of such construction, the force of impact of a collision with another vehicle or body is directly exerted on the car body. In other words, bumper devices of the prior art are not effective to positively absorb or break up the force of impact so as to preclude damage to the car body and injury to the occupants. In extreme cases, they merely perform a decorative function. Another inevitable disadvantage is that when a collision occurs the prior art bumpers art themselves are greatly damaged.

Accordingly, an object of this invention is to provide a novel bumper device for automobiles and other vehicles which is effective, when the vehicle on which the bumper device according to this invention is mounted is involved in a head-on collision, lateral collision or rear-end collision with another vehicle, to cause front and rear bumpers to equally bear the impact of collision, whereby damage to the vehicle and injury to the occupants can be positively precluded.

According to this invention, there is provided a bumper device for automobiles and other vehicles which permits, when a motor vehicle incorporating this invention is involved in a collision, a force of impact of the collision to be borne equally by a front body and a rear body of the vehicle in the form of pressure reducing forces. The present invention is effective to cause the force of impact of the collision to be borne equally by two portions of the vehicle body instead of by one portion, thereby precluding damage to the body.

This invention provides means to protect the body against damage and at the same time to protect the occupants against possible injury at the time of collision by proper operation of the parts involved.

The bumper device according to this invention is simple in construction and never fails in operation. All the parts involved operate positively and quickly, so that the device is reliable in performance.

Other and further objects are those inherent in the invention shown, described and claimed herein which will become evident as the description proceeds.

In the drawings:

FIG. 1 is a fragmentary transverse sectional plane view of the bumper device comprising one embodiment of this invention; and FIG. 2 is a schematic transverse sectional view of the bumper device comprising another embodiment of this invention.

In the embodiment shown in FIG. 1, this invention is incorporated in a front bumper and a rear bumper mounted on a car body. As shown a plurality of first cylinders 3 and 3 are mounted at opposite sides of a front body 2 and a plurality of second cylinders 27 and 27 are mounted at opposite sides of a rear body 26.

A piston rod 4 of a first piston 4a received in each first cylinder 3 is affixed to a first bumper plate 1 which is a front bumper, so that two piston rods 4, 4 are substantially integral with first bumper plate 1 which they support.

A piston rod 28 of a second piston 28a received in each second cylinder 27 is affixed to a second bumper plate 25 which is a rear bumper, so that two piston rods 28, 28 are substantially integral with second bumper plate 25 which they support.

A coil spring 6 is mounted on each piston rod 4 between a rear surface of first bumper plate 1 and a front end of each first cylinder 3. A coil spring 30 is mounted on each piston rod 28 between a rear surface of bumper plate 25 and a front end of each second cylinder 27. A coil spring 8 is mounted on each piston rod 4 between a front inner side of each cylinder 3 and each piston 4a. A coil spring 32 is mounted on each piston rod 28 between a front inner side of each cylinder 27 and each piston 28a.

A stopper 7 of annular shape made of rubber or a soft synthetic resinous material is attached to an outer front side of each cylinder 3. A stopper 31 of annular shape made of rubber or a soft synthetic resinous material is attached to an outer front side of each cylinder 27.

A connection opening 10 is formed at a rear end portion of each first cylinder 3, and a connection opening 34 is formed at a rear end portion of each second cylinder 27. A first pressure reducing valve 9 is disposed in each first cylinder 3 adjacent the connection opening 10, and a second pressure reducing valve 33 is disposed in each second cylinder 27 adjacent the connection opening 34.

A first diaphragm 5 forming a first oil chamber 5a is provided between each first pressure reducing valve 9 and each piston 4a, and a second diaphragm 29 forming a second oil chamber 29a is provided between each second pressure reducing valve 33 and each piston 28a. Each oil chamber 5a maintains communication with each connection opening 10 through each first pressure reducing valve 9, and each oil chamber 29a maintains communication with each connection opening 34 through each second pressure reducing valve 33.

As aforesaid, a pair of first cylinders 3, 3 and a pair of second cylinders 27, 27 are mounted on opposite sides of front body 2 and rear body 26 respectively. Connection openings 10 and 34 of the front cylinders 3 and rear cylinders 27 disposed on opposite sides of front and rear bodies respectively are interconnected by connection lines 11 and 35, each connection line 11 and each connection line 35 being maintained in communication with one another by a T-shaped connector 12.

Oil is filled in oil chambers 5a and 29a, connection lines 11 and 35 and connectors 12.

Left and right connectors 12 of the first cylinder 3 and second cylinder 27 on the left side and the first cylinder 3 and second cylinder 27 on the right side of the car body respectively are maintained in communication, through connection lines 13 and a connector 14, with pressure adjusting means 19 secured to the car body.

Pressure adjusting means 19 comprises a cylinder 20 mounting therein a sealed bellows 21 which is maintained in communication with an air supply valve 22. Compressed air is filled in an air chamber 23 of bellows 21, and oil is filled in an oil chamber 24 in cylinder 20 disposed outwardly of bellows 21. Check valves 15, 16 and 17 are mounted in connection ports of connector 14 maintained in communication with the oil chamber 24 in cylinder 20, and an oil supply valve 18 is mounted at one side surface of connector 14.

Operation of the bumper device described above will now be described by assuming that a motor vehicle incorporating this invention has collided with another motor vehicle at the first bumper plate 1 side. A force of impact exerted on first bumper plate 1 at the time of collision causes coil springs 6 to contract. At the same time, this force of impact and the resilience of coil springs 8 in first cylinders 3 combine to force first piston rods 4 and pistons 4a to move rearwardly. As piston rods 4 move rearwardly, the first diaphragms 5 mounted rearwardly of pistons 4a are compressed by pistons 4a and first pressure reducing valves 9, forcing the oil in oil chambers 5a to flow through first pressure reducing valves 9 to connection lines 11. When the oil passes through first pressure reducing valves 9, a pressure reducing force is produced which is borne by the front body of the motor vehicle.

The oil in connection lines 11 is forced into connection lines 35, and then into oil chambers 29a in second diaphragms 29 through second pressure reducing valves 33. A pressure reducing force produced at this time is borne by the rear body 26 of the motor vehicle. The pressure of oil flowing into oil chambers 29a causes the pistons 28a in second cylinders 27 to move forwardly. The forwardly moving pistons 28a causes second piston rods 28 to move forwardly while causing coil springs 32 to contract. This pressure and the resilience of coil springs 30 combine to cause rear bumper plate 25 to be displaced rearwardly an amount corresponding to the pressure of oil. In this way, the force of impact exerted on first bumper plate 1 is transmitted to second bumper plate 25.

Let us now consider the pressure reducing force produced by the first pressure reducing valves and borne by front body 2 and the pressure reducing force produced by the second pressure reducing valves and borne by rear body 26. In this connection, the following relations hold:

$$F_{1c} = A_4 \cdot P_5 - A_{10} \cdot P_{11} \quad\quad\quad (1)$$
$$F_{2c} = A_{34} \cdot P_{11} - A_{28} \cdot P_{29} \quad\quad\quad (2)$$

where
$P_5$: The pressure in oil chambers 5a in first diaphragms 5.
$P_{11}$: The pressure in connection lines 11.
$P_{29}$: The pressure in oil chambers 29a in second diaphragms 29.
$A_4$ : The pressure receiving area of first piston 4a.
$A_{28}$: The pressure receiving area of second piston 4a.
$A_{10}$: The area of connection openings 10 of first cylinders 3.
$A_{34}$: The area of connection openings 34 of second cylinders 27.
$F_{1c}$: The pressure reducing force borne by front body 2.
$F_{2c}$: The pressure reducing force borne by rear body 26.

The pressure and flow rate characteristic of the pressure reducing valves are approximated by the following formula:

$$Q = C \cdot \Delta P \quad\quad\quad (3)$$

where
Q : The flow rate of oil passing through pressure reducing valves.
C : Coefficient.

$\Delta P$: The pressure difference between the front and rear pressure reducing valves.

The following formula will be obtained if $A_4 = A_{10} = A_{34} = A_{28}$, first pressure reducing valves 9 and second pressure reducing valves 33 are of identical shape, and $P_{29}$ is small enough to be neglected, to enable the operation to be explained briefly:

$$P_{11} = 0.5 \cdot P_5$$

Assuming that $A_4 = A_{10} = A_{34} = A_{28} = A$ and $P_{11} = 0.5 \cdot P_5 = P$, the following formula will be obtained from formulae (1) and (2):

$$F_{1c}, F_{2c} = 0.5 \cdot A \cdot P$$

It will be seen that the arrangement of this invention permits the pressure reducing forces produced in response to the force of impact of collision to be equally borne by front body 2 and rear body 26 as contrasted to the arrangement in which $F_{1c}$ and $F_{2c}$ are produced by one pressure reducing valve and the pressure reducing force is borne by one member.

The same holds true of the bearing of forces by coil springol 6, 8, 30 and 32.

It will be self-evident that when the motor vehicle incorporating this invention is involved in a rearend collision the pressure reducing forces are equally borne by front body 2 and rear body 26 by the same action of the bumper device.

The air chamber 23 in pressure adjusting means 19 is filled with compressed air, so that oil can be supplied from oil chamber 24 through the oil supply valve 18 mounted at one side of connector 14 only when the quantity of oil in oil chambers 5a and 29a and connection lines 11 and 35 is reduced.

Let us now turn to a second embodiment shown in FIG. 2 in which a pair of first cylinders 42 are mounted at left and right sides of a front body 41 and a pair of second cylinders 52 are mounted at left and right sides of a rear body 51. A first piston rod 43 received in each first cylinder 42 is affixed at its front end to a first bumper plate 40, and a second piston rod 53 received in each second cylinder 52 is affixed at its front end to a second bumper plate 50, so that two piston rods 43 and two piston rods 53 are substantially integral with first bumper plate 40 and second bumper plate 50 respectively which they support.

A pair of coil springs 44 are mounted between a rear surface of first bumper plate 40 and a front surface of front body 41. A first pair of dampers 45 are also mounted between the rear surface of first bumper plate 40 and the front surface of front body 41.

A second pair of coil springs 54 and a second pair of dampers 55 of the same shape as the corresponding pairs of springs 44 and dampers 45 provided in the front portion of the motor vehicle are mounted between a rear surface of second bumper plate 50 and a front surface of rear body 51.

Each first cylinder 42 and each second cylinder 52 are formed with connection openings 46 and 56 respectively which are maintained in communication with one another through connection lines 47 and 57 interconnected by a connector 48. Connectors 48 are connected to pressure adjusting means 59 through connection lines 49 and a connector 58 as is the case with the connectors 12 of the first embodiment.

When a motor vehicle provided with a modification of the bumper device constructed as aforementioned according to this invention is involved in a head-on collision, first bumper plate 40 is displaced relative to front body 41, with a pressure reducing force being produced by the first pair of coil springs 44 and first pair of dampers 45. First piston rods 43 are also displaced so as to cause the oil in first cylinders 42 to flow into connection lines 47 in an amount corresponding to the displacements of first piston rods 43. The oil flowing into connection lines 47 passes through connectors 48 and connection lines 57 into second cylinders 52 so as to displace second piston rods 53.

At this time, the second pair of dampers 55 produce a pressure reducing force. It will be seen therefore that when a motor vehicle incorporating this invention is involved in a head-on collision pressure reducing forces produced in response to the force of impact of collision are borne equally by front body 41 and rear body 51.

The pressure adjusting means 59 of the second embodiment functions in the same manner as the corresponding means of the first embodiment.

In the first and second embodiments shown and described above, first bumper plates 1, 40 and second bumper plates 25, 50 have been described as been affixed to and supported by first piston rods 4, 43 and second piston rods 28, 53 received in first cylinders 3, 42 and second cylinders 27, 52 mounted on the front body 2, 41 side and rear body 26, 51 side respectively. It is within the scope of this invention to provide a third bumper plate and a fourth bumper plate (not shown) forming a pair on opposite sides of the motor vehicle or on opposite sides of bodies 2 and 26 or 41, 51. The third and fourth bumper plates may be provided with a mechanism similar to the one described in the first and second embodiments, so that the bumper device according to this invention can deal with a collision of the motor vehicle occurring not only at the front and rear end thereof but also on either side thereof.

What is claimed is:

1. A bumper device for automobiles and other vehicles comprising at least one pair of bumper plates provided symmetrically on opposite first and second sides of a vehicle body, at least one pair of piston cylinder mechanisms secured on said first and second sides of the vehicle body for supporting said bumper plates, at least one pair of connection lines for interconnecting the corresponding piston cylinder mechanisms and filled with fluid, at least one pair of plates secured to the cylinders of said piston cylinder mechanisms and connected between the pistons of said piston cylinder mechanisms and said connection lines; each of said plates having an orifice in the central portion thereof, the inner diameter of said orifice being smaller than the inner diameter of said connection lines, a first pair of coil springs mounted between rear surfaces of said bumper plates and front ends of the cylinders of the pair of piston cylinder mechanisms, and a second pair of coil springs mounted between inner front ends of the cylinders and pistons of the pair of piston cylinder mechanisms.

2. A bumper device claimed in claim 1 wherein said bumper plates are provided on front and rear ends of a vehicle body.

3. A bumper device claimed in claim 1 wherein said bumper plates are provided on right and left sides of a vehicle body as viewed from the front end of the vehicle.

4. A bumper device as defined in claim 1 further comprising a fluid chamber including a diaphragm arranged between the piston of a piston cylinder mechanism and said plate having said orifice.

5. A bumper device as defined in claim 4 wherein said fluid is oil.

* * * * *